US006973269B1

(12) United States Patent
Britz et al.

(10) Patent No.: US 6,973,269 B1
(45) Date of Patent: Dec. 6, 2005

(54) METROPOLITAN NETWORKS BASED ON FIBER AND FREE SPACE ACCESS DISTRIBUTION SYSTEM

(75) Inventors: David M. Britz, Rumson, NJ (US); Matthew J. Sherman, Succasunna, NJ (US); Jeevan P. Dodley, Parsippany, NJ (US)

(73) Assignee: AT&T Corp., New York, NY (US)

( * ) Notice: Subject to any disclaimer, the term of this patent is extended or adjusted under 35 U.S.C. 154(b) by 659 days.

(21) Appl. No.: 09/978,581

(22) Filed: Oct. 18, 2001

(51) Int. Cl.[7] ............................................. H04J 14/00
(52) U.S. Cl. .......................... 398/51; 398/54; 398/55; 398/56
(58) Field of Search .............................. 398/45, 46, 47, 398/48, 49, 50, 51, 55, 56, 58, 59, 66, 67, 398/54

(56) References Cited

U.S. PATENT DOCUMENTS

| 6,239,888 | B1 | 5/2001 | Willebrand | |
|---|---|---|---|---|
| 2002/0073086 | A1 * | 6/2002 | Thompson et al. | 707/10 |
| 2002/0191250 | A1 * | 12/2002 | Graves et al. | 359/128 |
| 2003/0007212 | A1 * | 1/2003 | Sala et al. | 359/136 |
| 2004/0109440 | A1 * | 6/2004 | Mattathil | 370/352 |

OTHER PUBLICATIONS

U.S. Appl. No. 09/639,635 filed on Aug. 15, 2000.

* cited by examiner

*Primary Examiner*—M. R. Sedighian
*Assistant Examiner*—Dzung Tran

(57) ABSTRACT

An architecture for facilitating wavelength-specific and packet-switched routing comprises a primary metropolitan fiber ring, a primary distribution/aggregation node in the primary metropolitan fiber ring and a local service domain further comprising a secondary aggregation node in communication with the primary distribution/aggregation node. A network to provide local metropolitan switching and routing and broadband local access distribution described in terms of its component layers comprises a distribution/aggregation routing layer that interfaces with a primary fiber metropolitan ring and a local customer primary distribution/aggregation node via transport branches of a mesh architecture, a local distribution and routing layer that routes specific wavelengths and newly assigned wavelengths to and from a customer's premises and a cross-connect layer that handles customer specific wavelength and packet routing via one of fiber, millimeter wave radio and free space optical communications.

28 Claims, 10 Drawing Sheets

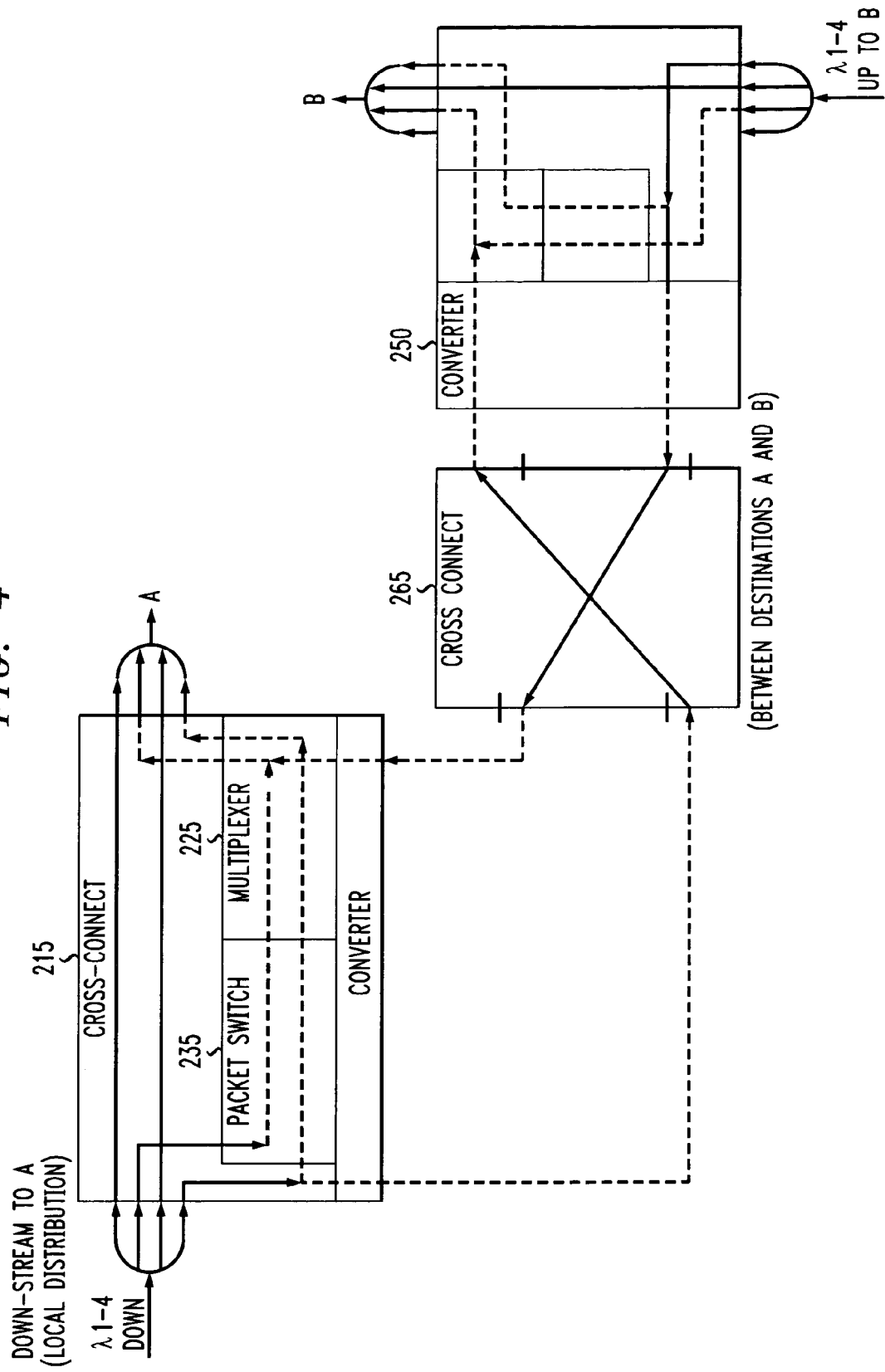

FSOC MAX TRANSMISSION DISTANCE

FSOC MAX BRANCH BREAK NO REDUNDANCY

DISTRIBUTION NODE 1  DISTRIBUTION NODE 2  DISTRIBUTION NODE 3  DISTRIBUTION NODE 4

METROPOLITAN NETWORKS BASED ON FIBER AND FREE SPACE ACCESS DISTRIBUTION SYSTEM

FIELD OF THE INVENTION

The present invention relates to local access broadband metropolitan switching and routing methodologies and distribution architectures encompassing the combination of fiber, free space optical communications (FSOC) and radio (or wireless) techniques.

BACKGROUND OF THE INVENTION

Free Space Optical Communications (FSOC) and millimeter wave radio technologies are a relatively new but potentially critical access technologies for broadband last mile access for building-to-building, LAN, metropolitan and ultimately residential neighborhood distribution. Market estimates predict the FSOC industry alone will be a $3 billion market by 2005.

FSOC technologies have been utilized for stadium, campus and building-to-building and private network applications since the late 1980's. Only recently have technologies, market demand and broadband access issues converged to migrate this technology toward mainstream telecommunications and local access network distribution applications. AT&T and other vendors desiring to enter local access markets but with no heritage equipment or infrastructure to do so may take advantage of this technology.

The creation or re-creation of existing metallic access infrastructure across the country to support traditional "wired" broadband access services would prove both very expensive and limiting in the long term for service providers in their efforts to bring broadband services to the customer. Hence AT&T's ongoing efforts in the cable industry and legal challenges for access rights to the existing local exchange carrier (LEC) infrastructure. These traditional metallic and newer cable and DSL deployment strategies may gain moderate bandwidth to AT&T's customers near term, but the existing metallic infrastructure will ultimately not support the surge in consumer bandwidth demand expected over the next ten years. Clearly an alternative technology and infrastructure solution are needed that can be created and deployed in parallel to the existing infrastructure but capable of handling the bandwidth expectation of the near future access networks.

The obvious answer to the near future bandwidth demand challenge is the ubiquitous deployment of fiber optics access networks and fiber-to-the-curb/fiber-to-the-home (FTTC/FTTH). But like other cabled technologies, fiber must be physically laid or hung between connecting nodes, the issues of trenching, rights of way and costs of fiber deployment and vulnerability, itself have significantly delayed earlier optimistic plans for wide scale fiber deployment and are likely to slow deployment even more as increasing cost overheads erode the fiber access business plans and amortization over a customer base. This leaves no clear or easy fiber-to-customer based solution.

Point-to-point wireless is an attractive intermediate broadband alternative to widespread fiber based broadband deployment. Millimeter wave radio can provide moderate bandwidth (OC3-12) over short distances, is rapidly and easily deployed/installed, without the need for physical connectivity to the customer or other issues associated with rights of way. On the down side millimeter wave radio, is a shared medium and subject to regulatory and spectrum license control. Further, millimeter wave radio is a line-of-sight system and subject to weather related limitations. Channel reuse is limited thereby suppressing the scalability of a radio access deployment within a residential or metropolitan customer base.

SUMMARY OF THE INVENTION

Alternatively, FSOC is an optical fiber-like service. FSOC technology is also a "through-the-air" point-to-point deployment architecture and similar to millimeter wave wireless local multipoint Distribution System (LMDS) in its ease of installation and deployment. FSOC is also similarly limited by climatic conditions, but is critically, free of government regulatory and spectrum licensing. FSOC operates at optical wavelengths and frequencies that can provide enormous bandwidth per wavelength and utilize multiple wavelengths within the bundled beams transmission path, including single, multiple "coarse" WDM and dense wavelength division multiplexing (DWDM) applications. Most significantly FSOC is a means to provide smooth low cost deployment and distribution of these wavelengths to individual customers and ultimately the smooth deployment of wavelength-based packet-switching without the considerable cost and deployment restrictions of fiber and the restrictive spectrum and licensing costs of millimeter wave radio.

It is becoming increasingly clear that metropolitan optical networks will consist of a blend of fiber and optical/radio wireless distribution architectures. This blend of broadband access technologies is driven primarily by the increasing cost, deployment delays and restrictions on fiber deployment and city trenching. These broadband technology blends will likely be coupled into locally intelligent routing configurations via statistically placed switching and routing aggregation nodes. These nodes will themselves couple transparently to the core/long haul network and form the fabric of an all optical broadband communications structure reaching to and from the customer "first mile/last mile" access domain through the core optical network to its target local access destination. The distribution nature of free space, fiber or millimeter wave radio coupled with the unique and flexible switching/routing architecture of these aggregation nodes, and an operational description of these nodes and their capability to switch single/multiple wavelengths, lambda or packet-switching based (or some blend thereof), is the subject described herein. The invention also provides a flexible transport architecture that will equally facilitate the transmission of wavelength or packet routing network scenarios.

It is therefore an object of the present invention to provide a local metropolitan switching and routing architecture encompassing a variety of technologies that provides broadband local access distribution.

It is a further object of the present invention to provide a flexible transport architecture that will facilitate both wavelength-specific and packet-switched routing.

BRIEF DESCRIPTION OF THE PREFERRED EMBODIMENTS

The invention is best described with reference to the detailed description and the following figures, where:

FIG. 4 is a high level branch-to-node-to-branch schematic showing the primary elements utilized in a node-to-node cross connects via packet (wavelength) assignment and routing within the network mesh configuration.

DETAILED DESCRIPTION OF THE PREFERRED EMBODIMENTS

Figure 1A:
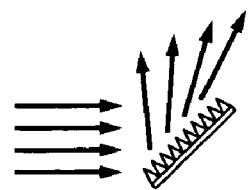
FIG. 1 depicts several of the known demultiplexing techniques.

Metropolitan routing architectures and switching/routing devices that can handle both wavelength and packet-switching will be critical at different layers of the metropolitan networks in the near term. Other complementary technologies such as local multipoint distribution system (LMDS) radio and free space optical communications (FSOC) will likely be used to reach the customers ahead of fiber, to secure the service revenues and provide broadband connectivity to the customer base. Like fiber-based distribution, a decentralized and layered routing approach, that is locally autonomous, will likely be necessary for these wireless access technologies and future IP-based local network architectures. Local metropolitan routing methodologies will consist of a wirelessly interconnected series of aggregation points capable of routing customer data through the air and or where available, through fiber.

Metropolitan and access networks of the present invention consist in part of fiber from the core network, dedicated fiber directed to specific buildings or point of presence (POP), and from those deployment locations wireless distribution architectures (both radio and free space optical) to provide a broad range of customer premises access within the service space defined by the service provider. Metropolitan networks of the present invention also employ intelligent aggregation and distributed interconnecting nodes that connect these bi-directional wired and wireless links into a seamless access network that is transparent and compatible with the core network architecture.

The purpose of the local access nodes will be to aggregate and disseminate bi-directional customer packet- or wavelength-based data within the defined metropolitan service space. Heading up-stream toward the network, the nodes will aggregate multiple customer specific wavelength packet data, inserting and accruing this data into the next aggregation layer packet stream. Heading down-stream from the core network, the distribution nodes will demultiplex wavelengths carrying local customer packets, extracting local customer packets, dropping the local customer packets into the next access distribution layer for local routing. The through-data packet traffic will be passed on and inserted back into the WDM optical link along with locally generated customer data-packet or customer wavelength specific traffic. The down-stream traffic is then directed to the next aggregation and distribution node point for further distribution and routing.

These aggregation and distribution nodes will smoothly partition the distribution of bandwidth into the deeper access distribution layers until the customer is receiving single or multiple wavelengths that carry their specific data. Ideally the last link to the customer will carry data at a level consistent with direct optical-to-electrical conversion into a customer's premise equipment or network terminating device (NTD) where the wasteful and lossy optical-to-electrical conversion is no longer an issue. From the network perspective, the customer return path data will appear to be packets mixed with many other packets located within a specific wavelength channel directed to that metropolitan fiber hub. From the metropolitan primary aggregation/distribution node, the packets will be directed to next lower layer distribution nodes, aggregated into new packets that are multiplexed and directed via a suitable (possibly different) wavelength to the next lower or deeper distribution layer node. Ultimately, this process is repeated until the customer receives a locally generated wavelength with their specific packets.

IP-based broadband communications are ideally suited to the FSO communications environment and service applications because the customers data "packets" are sequentially labeled (header) such that if a packet is lost to the network and not received by the customer, the network is alerted and able to resend the packet. This architecture works well in unstable transmission and "bursty" mediums such as the atmosphere and is suitable for data intensive applications such as high-speed interactive/multimedia Internet. IP architectures are troublesome for applications such as traditional POTS (Plain Old Telephone Service), voice and video which rely on continuous and smooth sequential data flow from the network to the customer to provide the perceived high quality service. Tremendous research and development resources are being successfully applied to IP architectures to improve their voice and video compatibility; such service enhancements should be directly compatible with transport technologies such as FSOC and as such complementary to the above embodiment.

From the customer's perspective, the outgoing traffic will be a single modulated wavelength (possibly already packetized) directed to the nearest lowest layer network aggregation node via fiber, free space or radio. At this node location the customer's low bandwidth data will, if necessary, be optically-to-electrically converted, packetized and assigned a new optical wavelength suitable for being multiplexed and aggregated with other customer packets heading into increasingly higher bandwidth streams back to the core network. The aggregation and distribution nodes will have to be capable of wavelength demultiplexing the multiple incoming and outgoing wavelengths, reading optically transported packet header information from up-stream/down-stream locations and changing the wavelength-assigned packets to more suitable wavelengths for re-multiplexing the packets back into the outgoing packet stream. Wavelength conversion prior to re-multiplexing, may also be a necessary feature for the above described system to avoid wavelength clashes and crashes (two identical wavelengths arriving at the same point at the same time from different sources) within the mesh domain and conformance to outgoing (up-stream) wavelengths. This may be particularly important for locally generated wavelengths.

At the highest levels of this local access network, the customer's packets may be routed over multiple network-provided wavelengths from the network hub. The primary node may locally select new wavelengths that are directed down-stream, and transmitted via consecutive nodes to the customer's final last node drop. At the last drop, a dedicated wavelength will provide connectivity to that single customer or multiple customers in the case of a multi-tenant unit (MTU) or apartment, or, similarly, a small multi-business commercial structure. Choices of multiple or single wavelengths that can be demultiplexed and reassigned at each aggregation and distribution nodes will be a feature of this local access network. Depending on local customer traffic, the multiple wavelength-based packets that are not redirected to local customers are multiplexed back, unchanged, into their specific wavelength or reassigned to a new locally available wavelength up-stream/down-stream and cross-connect channels. Two methods of wavelength packet distribution are possible; wavelength-specific packet distribution and wavelength non-specific packet distribution. It is also possible to have an adaptive blend of both wavelength distribution architectures where specific customers are prepared to own and pay for a specific delivered wavelength while the rest of the customers are supported by a packet and wavelength mix determined by the local distribution nodes.

In wavelength-specific packet distribution, a dedicated customer wavelength (provided by the network) is delivered to/from each distribution node carrying all the customer's traffic to that location. This fixed wavelength assignment reduces the system flexibility and redundancy. If there are multiple local customers assigned to that wavelength and distribution node location, specific customer packet routing and distribution will occur at the node by a variety of distribution means including, for example FSOC, fiber and millimeter wave radio frequency. This single wavelength distribution architecture is compatible with star/branch architectures requiring packet and wavelength allocation by the network central office. Customer packet allocation with this scenario is fixed by the bandwidth available for each wavelength and the number of customers. The star/branch architecture is simple and low cost but has minimal flexibility and compatibility for mesh type link redundancy.

In wavelength non-specific packet distribution, a customer packet can be assigned to any wavelength that is being routed through the specific node; the packet header is read and if recognized, demultiplexed to the local distribution layer and on to the customer. If the packet header is not recognized, the packet is passed on and multiplexed with the outgoing packet traffic on a suitable wavelength and transmitted on to the next distribution node for regeneration and distribution. In this configuration a particular wavelength may travel the full length of the multi-hop branches until it reaches its customer. The wavelength non-specific packet distribution architecture is capable of off-loading (dropping) and on-loading (adding) different customer packets at each node and providing multiple branch route to and from the network.

Because the non-specific packet-bearing wavelength is regenerated at each node and travels the entire mesh branch, it is possible for each distribution node along the mesh branch to have multiple cross-connective branches going to, and coming from other nodes. This multi-entry and multi-exit concept provides the basis for a highly redundant mesh-like node distribution architecture that provides multiple access paths for the customer's packets because the packets are wavelength independent. Packets can be assigned to a specific wavelength at each distribution node to avoid incoming wavelength crashes at a particular node. This drives the complexity and decision-making requirements of the optical network down to the distribution node level, increasing the complexity of each node and its cost, but the costs of all-optical add-drop multiplexers (ADMs), switches and routers are dropping rapidly and this will only increase their suitability for this application over time.

This local access all-optical routing and distribution architecture also requires a dedicated control layer that is independent of the transmission layer and is itself highly robust. The control layer can be based around a dedicated optical channel as is known in the art or more preferably via an alternative technology that is not dependent on the same weather limiting conditions such as land-lines or RF/cellular systems as is taught in the prior art. The low data-rate control layer communicates with each distribution node via a broadcast approach for down-stream traffic independently from each node for up-stream traffic. The control layer receives link status, and routing-complete information from each distribution node site. The control layer also allows nodes local to each other to send limited notification of the distribution node customer packet information including header and nearest customer/node location, node routing and packet wavelength assignment to each other. Prior art in the form inter-cellular radio handoffs and AT&T research into semi-autonomous intelligent radio port (IRP) architectures show the possibility for locally autonomous and intelligent radio layer resource management, decision making and hand off capabilities for "cells-nodes" remote from a central office and or vendor POP. Similar broadcast intelligent radio layer resource management techniques and algorithms could be applied to the mesh architecture defined within this embodiment. The use of a broadcast scenario would allow the tertiary aggregation and distribution nodes (switches), to respond to header information being broadcast down-stream from the network (secondary aggregation node) in the fastest possible time and sets up a storable "linked" switch configuration for up-stream return path for faster packet-switching response until that customer circuit is disconnected. Such an arrangement allows the ganged optical switch configuration, which can be associated (and stored within the look-up table) with the current customer circuit address until the circuit is disconnected. The individual aggregation and distribution nodes can be readied to be reconfigured (via the down-stream radio broadcast information) in preparation for the packet arrival coming through the network and as well as the return path up-stream.

A critical element of above wavelength routing and switching concept is the easy disassembly and re-assembly of bundled wavelengths commonly referred to as WDM or the more complex DWDM. For wavelength routing to occur, select or multiple wavelengths must be withdrawn from the bundled group, processed, and packets re-directed out of the wavelength for local delivery or re-routing. The remaining packets contained within these demultiplexed wavelengths must then be re-inserted into the proper wavelength channel and multiplexed back into the WDM or DWDM wavelength bundle for ongoing transmission to the next node along the branch.

Figure 1B:
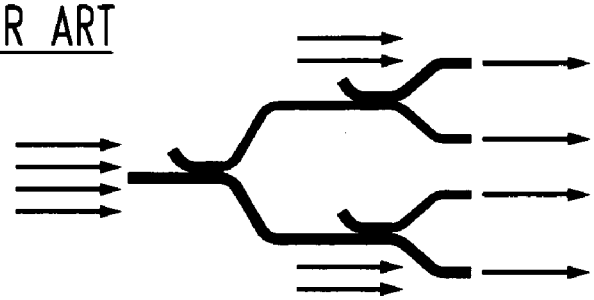
Figure 1C:
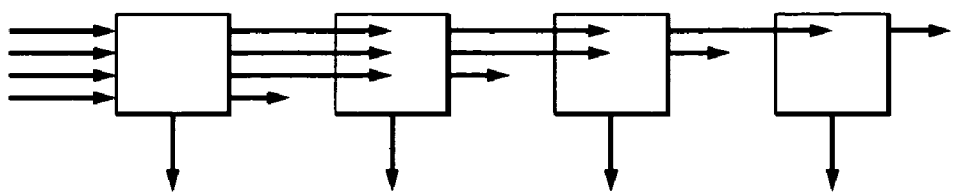

Many techniques exist for this wavelength demultiplexing process. FIG. 1 depicts several of the known demulitplexing techniques but the demultiplexing process of the present invention is not limited by the techniques depicted in FIG. 1. FIG. 1(a) shows the use of grating technology to demultiplex a bundle of wavelengths and forward the demultiplexed wavelengths to a variety of paths. FIG. 1(b) shows the use of fused biconically tapered fiber couplers. Fused biconically tapered fiber couplers are symmetrical devices arranged in a tree structure. A first stage demultiplexes the bundle of wavelengths into two combs. In the example depicted in FIG. 1(b), there are four wavelengths in the bundle. The first stage consisting of a single fused biconically tapered fiber coupler that demultiplexes the bundle of wavelengths into two combs of two wavelengths each. The second stage consists of two fused biconically tapered fiber couplers in series with the first fused biconically tapered fiber coupler, each of which demultiplexes the comb used as its input into a single wavelength. FIG. 1(c) shows the use of electro-holographic crystal technology for demultipexing. In the example used in FIG. 1(c) there are four wavelengths in the bundle of wavelengths. Four electro-holographic crystals would be used, each crystal demultiplexing or extracting a single wavelength. The electro-holographic crystals in effect become voltage-controlled fiber Bragg gratings (FBGs). Due to their structure, crystals can be employed to direct any wavelength onto any fiber.

Figure 2:
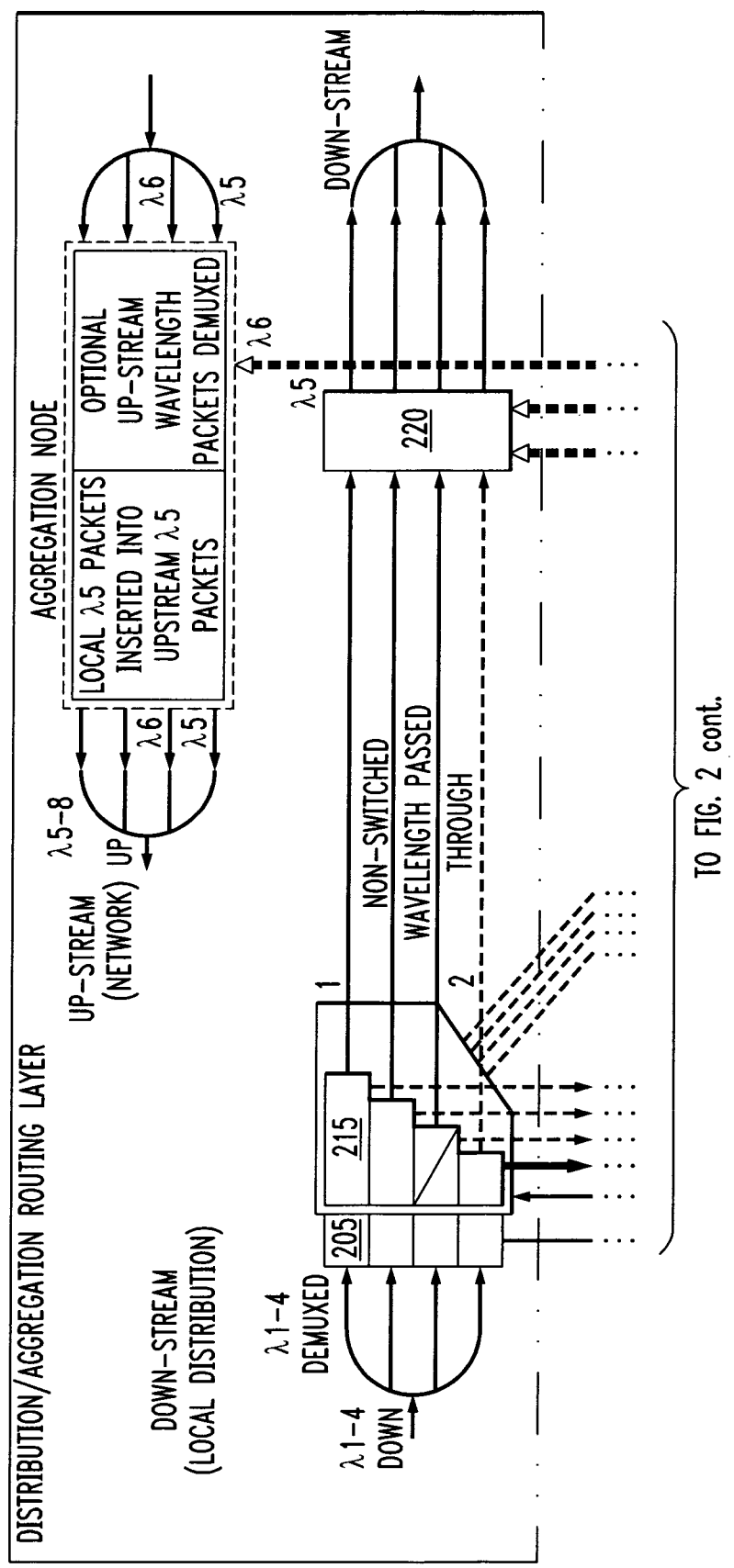
FIG. 2 is a schematic block diagram of an exemplary embodiment of a primary distribution/aggregation node (with wavelength assignment and cross-connect) for the architecture of the present invention.
Figure 2:
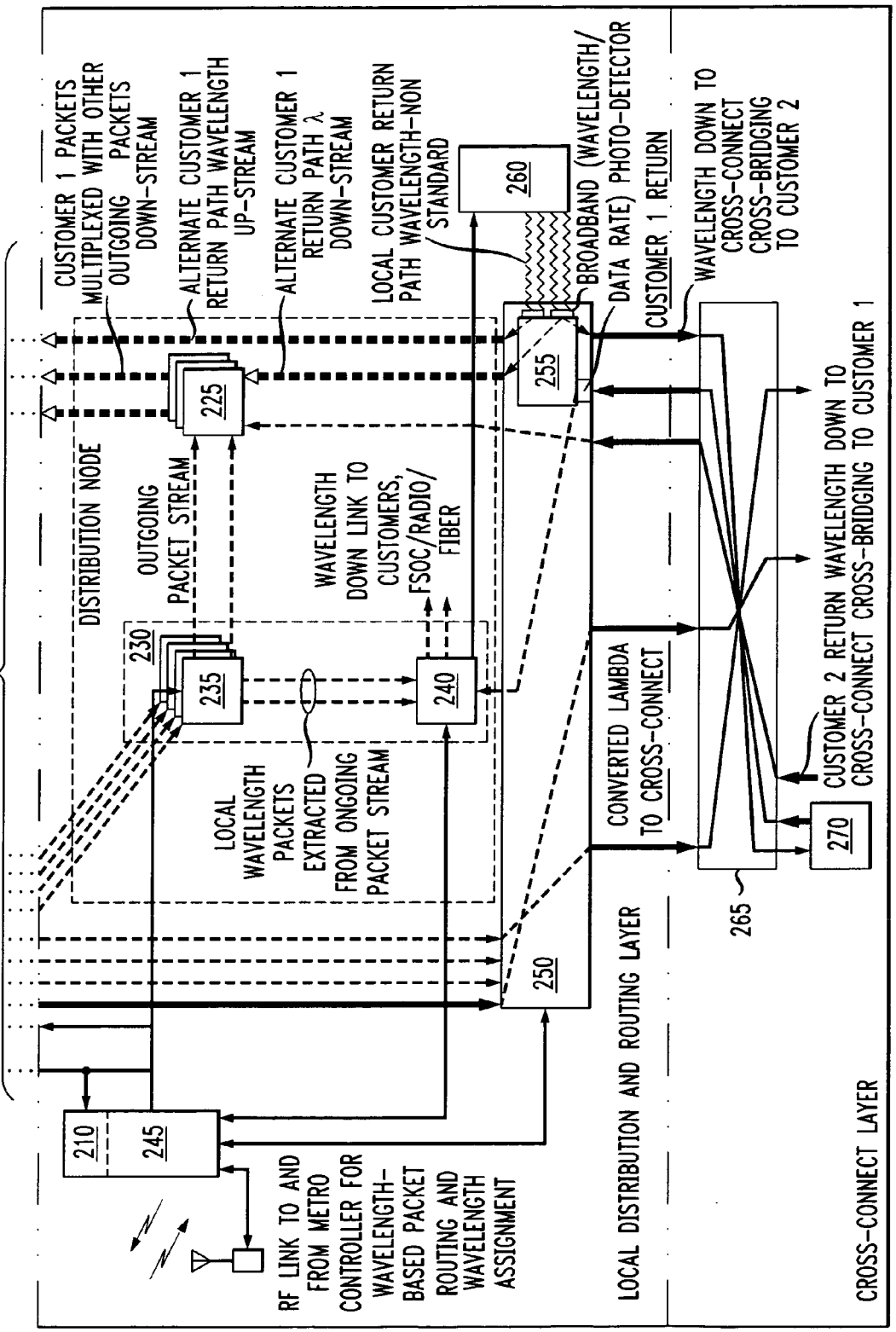

FIG. 2 is a schematic block diagram of an exemplary embodiment of a primary distribution/aggregation node (with wavelength selection and node-to-node cross-connect) for the architecture of the present invention. In the exemplary embodiment there are three layers. While described separately in terms of a distribution node and an aggregation node, these two entities (distribution node and aggregation node) together make up the primary distribution/aggregation node of the present invention. The topmost layer, labeled distribution/aggregation routing layer, interfaces with the primary fiber metropolitan ring and the local customer primary distribution/aggregation node via the transport branches, i.e., FSOC/radio mesh architecture of the present invention. The middle layer, labeled local distribution and routing layer, routes specific wavelengths or newly assigned wavelengths containing data packets to or from a customer's premises. The lowest layer, labeled cross-connect layer, handles the direct customer wavelength or packet traffic routing between the local customers via the FSOC, optical or radio transport branches.

Taking the down-stream path first, in the exemplary embodiment depicted in FIG. 2, wavelengths and wavelengths carrying data packets destined for a customer's premises are propagated on a bundle of wavelengths labeled "λ 1–4 down". For purposes of the description herein, four wavelengths are shown for the down-stream path. This bundle of wavelengths is optically demultiplexed in accordance with the techniques illustrated in FIGS. 1(a)–1(c) or any equivalent technique. The demultiplexed wavelengths are labeled "λ 1–4 demuxed".

Each demultiplexed wavelength is forwarded to one of a plurality of wavelength packet header readers 205. The ability to read the packet header information in real time is currently being demonstrated by several companies using all-optical holographic technologies. Such high-speed wavelength packet header readers allow the packet destination to be determined without the necessity for in-line packet storage. Optically readable holographic look-up tables 210 also provide the opportunity for look-up table upgrades via the received optical channel. An optical wavelength packet header reader 205 determines the packet destination loaded on a specific wavelength by referring to the stored look-up table 210 for local customers. If an address is not matched to a stored address, the packet is ignored and passed on through an 1×3 optical cross-switch 215, for re-insertion into the ongoing optical (wavelength) channel via the remultiplexer 220. Note the 1×3 optical cross switch is only one embodiment. Cross-switches with a greater or lesser number of cross-connects i.e., 1×4 or 1×n are possible for different option configurations.

A distribution node, labeled and indicated by a dotted line surround, of the present invention includes a plurality of wavelength packet multiplexers 225 and the local distribution wavelength packet switches 235 and the distribution transport medium such a FSOC. The local distribution wavelength packet switches 235 and the local distribution wavelength packet router 240 constitute the wavelength packet local distribution subsystem 230, which is further illustrated and described (with other components) in FIG. 3. The distribution node resides in the local distribution routing layer.

If the header packet address does match a local customer address, the switch controller 245 switches the particular customer wavelength packet via a 1×3 wavelength (switch location 2) packet cross-switch 215 to the remultiplexer 220. A 1×3 wavelength packet cross-switch is capable of propagating the packet to any one of three paths. In the case of the exemplary embodiment, depicted in FIG. 2, one propagation path is to the remultiplexer 220; a second propagation path is to the local distribution wavelength packet switch 235; and the third propagation path is to the bi-directional Lambda 1 to Lambda "n" converter 250 and thereafter to the wavelength packet cross-connect 265. Such 1×3 wavelength packet cross-switches 215 are now available including switches implemented using electro-holographic crystal technology. For purely wavelength routing or customer specific wavelengths, with no packet address information contained within the packet, the same 1×3 wavelength packet cross-switch can be controlled via a separate radio control layer to switch/route the customer wavelength at will and for as long as the optical circuit is required. Dedicated customer wavelength routing, using the radio control layer is inherently slower in its switching cycle than is packet-switching, since the wavelength switching/routing cycles are much less frequently performed, if at all. But the same high-speed optical switch used for packet switching can be used for the wavelength routing embodied in this invention, thereby providing flexibility between wavelength and packet routing. A packet header-like address can be attached to a dedicated customer wavelength circuit arrangement for applications lying between dedicated customer wavelength routing and purely packet switching.

The look-up table 210/switch controller circuit 245 assigns switching sequences and output ports that correspond to a specific customer location. While the switch controller circuit 245 switches the specific customer wavelength packets out of the wavelength channel on which the wavelength packets are being transported, the look-up table 210/switch controller circuit 245 sends out in parallel the sequential time slot switching sequence commands to the wavelength packet local distribution subsystem 230, which is responsible for routing wavelength channels or specific time-slot wavelength packets to specific customers. The switch controller circuit 245, governed by the look-up table 210, sets up the sequential time slot switching using, for example, a matrix of electro-holographic switches. Dedicated wavelength channels could also be routed via relatively slow electro-mechanical MEM micro mirror arrays. Preferably, higher speed switching/routing approaches may be achieved by modified arrangements of existing electro-holographic crystals. Where different customer packets within the same wavelength channel can be switched out of the wavelength channel and directed to a waiting fiber or FSOC telescope. Since the electro-holographic crystals can switch very quickly, or stay switched indefinitely, thereby the crystals can handle both the packet-switching and the wavelength-switching and as such have the operational flexibility to be the preferred configuration.

If the packet header address matches the address of the local node/customer, then the 1×3 wavelength cross-switch forwards the data packet to the wavelength packet local distribution subsystem where the local customer 1's wavelength packets are extracted from the ongoing packet stream. The extracted wavelength packets are sequentially time slot switched and forwarded to a local distribution wavelength packet router 240, which may be a micro-electronic mirror system (MEMS) array or an electro-holographic crystal switching array, or other suitable switching technology.

Exiting the local distribution wavelength packet router 240, the customer specific wavelengths and packets are directed to the distribution local link (e.g., FSOC telescope) that has been previously set up and assigned to a specific customer 1's premises 260. This transport may be achieved by a variety of means including millimeter wave radio, fiber and free space technologies. Optical amplification of the out-going packet wavelengths may also be needed. The wavelength-based packets are transported to the customers receiving transceiver and directed photonically or electrically to the customer's NTD at the customer 1's premises 260. The remaining packet traffic, if not directed to a local customer address, is passed on through the local distribution wavelength packet switch 235 and passed on to the wavelength packet multiplexers 225.

The plurality of wavelength packet multiplexers 225 combine multiple sources of wavelengths including the specific customer's and other local customers up-stream/down-stream return path packets back into a network (wavelength) compatible packet stream. There will be a wavelength packet multiplexer for each primary transmission wavelength for down-stream and up-stream wavelength (channel) directivity within the aggregation node. The plurality of wavelength packet multiplexers 225 will accept packet traffic that is loaded on a specific wavelength channel, but is not designated for local distribution or cross-connecting. The plurality of wavelength packet multiplexers 225 multiplexes the wavelength packets and inserts the wavelength packets into a suitable out-going up-stream/down-stream direction specific wavelength channel for transmission to another node designated by their header information.

At the cross-connect layer, specific wavelength packets may come from a local customer 1 and are electrically detected, wavelength assigned and directed to the node's wavelength packet cross-connect 265 and on to customer 2's premises 270. The optical packets transmitted from customer 1 are optically-to-electrically detected at the bi-directional Lambda 1 to Lambda "n" converter 250, the header information is electrically read and the electrical packet is directed to a electrical-to-optical converter 255 for conversion to a wavelength suitable for transfer through the wavelength packet cross-connect 265, either to the up-stream or down-stream wavelength packet multiplexer or onto the wavelength packet cross-connect 265. Wavelengths are selected (via the local radio communications inter-node layer) so as to not "crash" with non-available wavelengths on the other side of the wavelength packet cross-connect 265 or wavelength packet multiplexer 225. Therefore, wavelength "packets" are able to travel from one distribution node to another distribution node via the cross-connects. Similarly optical packets coming from customer 2 are first wavelength configured (if needed), via the bi-directional Lambda 1 to Lambda "n" converter located on customer 2's side 270 of the wavelength packet cross-connect 265 and then directed to the customer 1's bi-directional Lambda 1 to Lambda n converter 250 where they are electrically detected (if needed), and assigned a wavelength and switch (port) within the local distribution routing layer for transport on to customer 1's premises 260. Note these arrangements allow customer 1 to customer 2 connectivity without having to go through the entire mesh network. Alternate means besides optical-to-electrical and electrical-to-optical wavelength selection exist and may be applicable. The current embodiment utilizes optical-to-electrical and electrical-to-optical (O-E-O) wavelength selection due to the local individual customers typically having lower bandwidth utilization/requirements and the lower costs associated that the greater access mesh architecture. As customers migrate to higher bandwidth utilization, O-E-O techniques may no longer be suitable for individual customer wavelength assignment so other wavelength conversion techniques may be engaged. The bi-directional Lambda 1 to Lambda "n" converter and packet generator 250 allows non-crashing wavelength assignment and cross-switching of packets between node/mesh directions.

Figure 3:
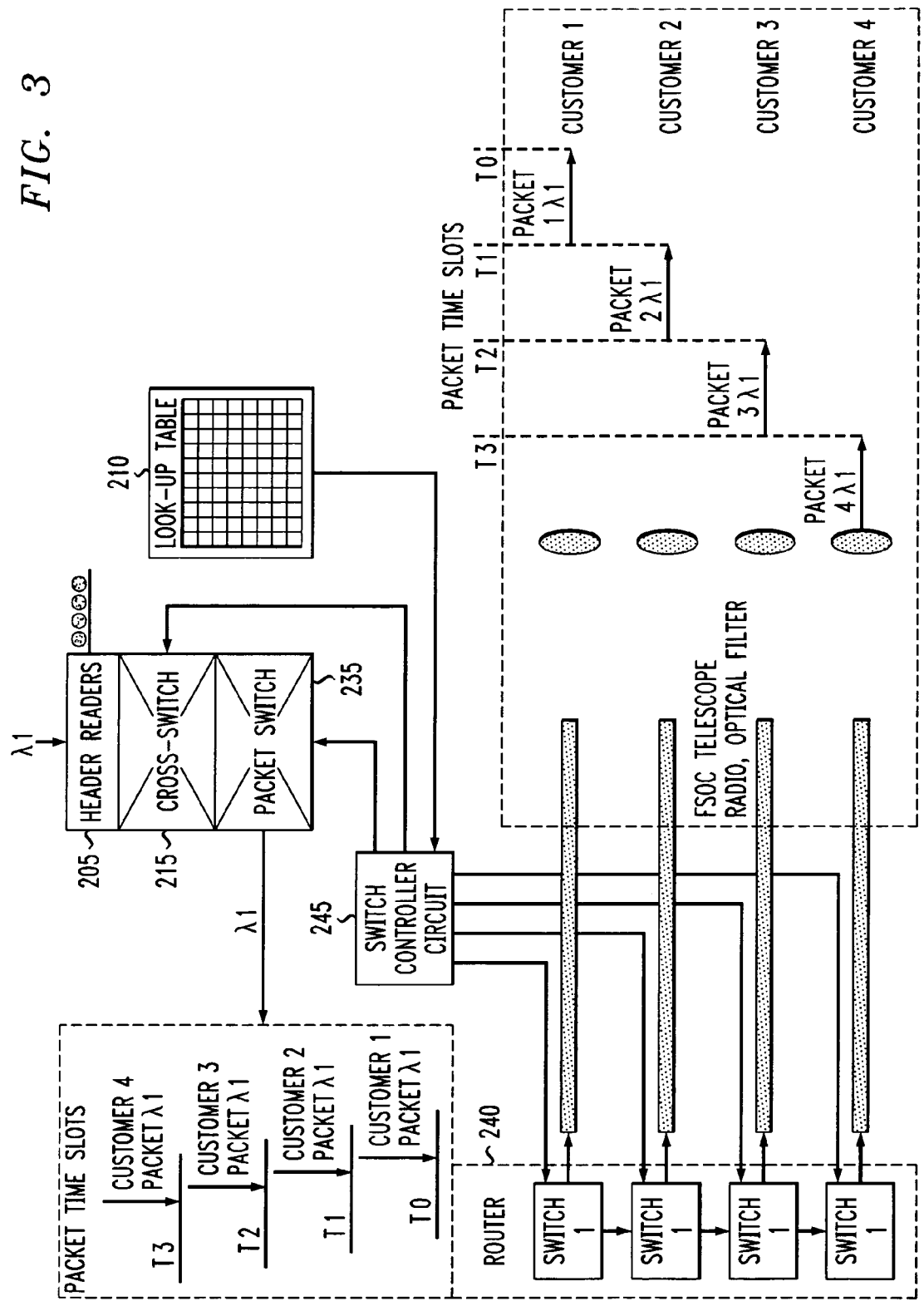
FIG. 3 illustrates a local customer distribution layer embodying a serial array of high-speed optical switches or a matrix of electro-holographic switches, controlled via the local node look-up tables and switch controller circuit, intercepting and switching individual packets out of the wavelength packet stream and directing the packets to the dedicated customer port.

The wavelength packets, to be locally deployed to a specific local customer, must be first extracted from the wavelength channel and redirected individually to the customer port for further transmission to the customer 1's premises 260 via fiber, FSOC or RF means. FIG. 3 illustrates a serial array of high-speed optical switches or a matrix of electro-holographic switches, controlled via the local node look-up tables 210 and switch controller circuit 245, intercepting and switching individual packets out of the wavelength packet stream and directing the packets to the dedicated customer port. The customer port would connect to a distribution transport medium i.e., FSOC or radio and then be directed to a customer 1''s premises 260. The optical switching sequence of the layered optical switches, to provide connectivity from the node to node or to the customer specific port, could effectively be ganged together, in parallel, via commands generated from the wavelength packet header reader 205 in response to the packet "header" address information, thereby minimizing switch set-up time and eliminating packet storage as the correct switch sequence is being configured.

Referring again to FIG. 2, in some node routing scenarios, wavelength packets may need a new wavelength channel assignment for reinsertion into the down-stream or up-stream channels. The node packet cross-switch may also require a specific wavelength channel other than the one on which the specific packet is propagated. It is, therefore, necessary that wavelength conversions be possible within the node to meet the traffic network routing demands. The practice of wavelength conversion is available in "all optical" as well as optical-to-electrical-to-optical (O-E-O) methods. The successful wavelength/channel assignment between nodes can be negotiated through a control layer inter-node communications scheme.

Now considering the upstream path, in the exemplary embodiment depicted in FIG. 2, wavelength packets can travel from one distribution/aggregation node to another distribution/aggregation node via the wavelength packet cross-connect 265. Essentially, in terms of the architecture depicted in FIG. 2, this amounts to a right angle turn for a packet at the cross-connect layer further illustrated in FIG. 4 and described hereinafter. Packets in this situation will now begin their up-stream/down-stream migration in a different direction.

Customer 1's data returning to the distribution/aggregation node may not be packetized, but may be locally wavelength modulated or use other such dedicated optical modulation methods. More critically, the returning wavelengths may be provided by LEDs or lasers at different non-ITU compliant wavelengths. As such, the customer return path receiver should include, in principal, an optical-to-electrical (O-E) converter 255, preferably a photodetector of suitable speed and sensitivity and broad wavelength sensitivity. Due to the customers relatively slow data speed (compared to the network), the resulting electrical modulation signal can then be packetized and converted to a suitable wavelength compatible with down-stream, up-stream or cross-connect wavelengths assigned direction. These newly generated wavelength packets can now be directed to the wavelength packet multiplexer 225 where the newly generated wavelength packets can be multiplexed with other locally generated customer packets and inserted into the suitable outgoing multi-customer packet stream wavelength channel. Note although not shown for reasons of complexity in FIG. 2, the up-stream aggregation node also contains a wavelength packet multiplexer to insert the customer 1 packets. Suitable wavelength selected from customer 1's bi-directional Lambda 1 to Lambda "n" converter 250 to the up-stream aggregation node is achieved via the nodes internal electrical control layer and in conjunction with the local look-up table 210/switch controller circuit 245. The RF control layer assigns the packet routing and wavelength/direction for inter-node transport. The 1×3 wavelength packet cross-switch 215 is also able to route identified wavelength packets directly down to the bi-directional Lambda 1 to Lambda "n" converter 250, assign new wavelengths if needed, or direct the existing wavelength packets out to the wavelength packet cross-connect 265 for routing to other local nodes within the mesh. The wavelength packet cross-connect 265 provides routing between its distribution arms.

Leaving the wavelength packet multiplexer 225, the newly generated multiplexed wavelength packets are forwarded to remultiplexer 220 for re-multiplexing and integration with the non-switched wavelengths leaving the 1×3 wavelength packet cross-switch 215. The combination of newly generated wavelength packets and non-switched wavelengths can be forwarded either to a further node down-stream or to an aggregation node up-stream. In the exemplary embodiment depicted in FIG. 2, four upstream wavelength, labeled "λ 5–8", are used for illustrative purposes. These wavelengths are indicated as both up-stream flowing wavelengths or local packets on wavelengths. In either case, the up-stream wavelengths may be optionally demultiplexed at an aggregation node. Locally generated packets on suitably selected wavelengths are inserted into the up-stream packets via a multiplexing process. Note as with the above up-stream aggregation of locally generated wavelengths, the receive side of the up-stream aggregation node also contains a set of wavelength packet header readers and 1×3 wavelength packet cross-switch which can alternatively direct wavelength packets to the common local distribution wavelength packet switch 235 for local customer 1's distribution, or to the bi-directional Lambda 1 to Lambda "n" converter 250 and onto the wavelength packet cross-connect 265 or alternatively may be passed through unaffected for remultiplexing back into the up-stream traffic.

The availability of high-speed optical switches, optical packet header readers and wavelength demultiplexing devices provides for the opportunity to take selected wavelength-specific data packets and route them through the above described architecture to destinations different from the branch the packets arrived on. In one mode of operation, selected switches open simultaneously via a command from the node controller and the packet is able to travel all the way to the wavelength packet cross-connect interface where the packet leaves the local distribution node and travels to another node thereby allowing packets to migrate from node to node in different directions, and providing the structure of a mesh-like network. This feature requires each local node look-up table 210 to have some limited high-level knowledge of the other node locations and their customer addresses and assigned wavelength/directions.

FIG. 4 illustrates the communication between nodes A and B using a common wavelength packet cross-connect (between nodes A and B) 265. Node A is shown on the left of FIG. 4 and node B is shown on the right of FIG. 4. The 1×3 wavelength packet cross-switch 215 is able to route wavelength packets to the local distribution wavelength packet cross-switch 235 or to the common wavelength packet cross-connect 265. Wavelength packets routed to the local distribution wavelength packet cross-switch 235 are then routed to the wavelength packet multiplexer 225 and thereafter outgoing from node A. Wavelength packets from node A routed directly through the common wavelength packet cross-connect 265 are forwarded to node B through node B's Lambda 1 to Lambda "n" converter and packet generator 250 and up-stream from node B. Wavelength packets from node B routed directly through the common wavelength packet cross-connect 265 are forwarded to node A through node A's Lambda 1 to Lambda "n" converter and packet generator 250 and up-stream from node A.

Figure 5A:
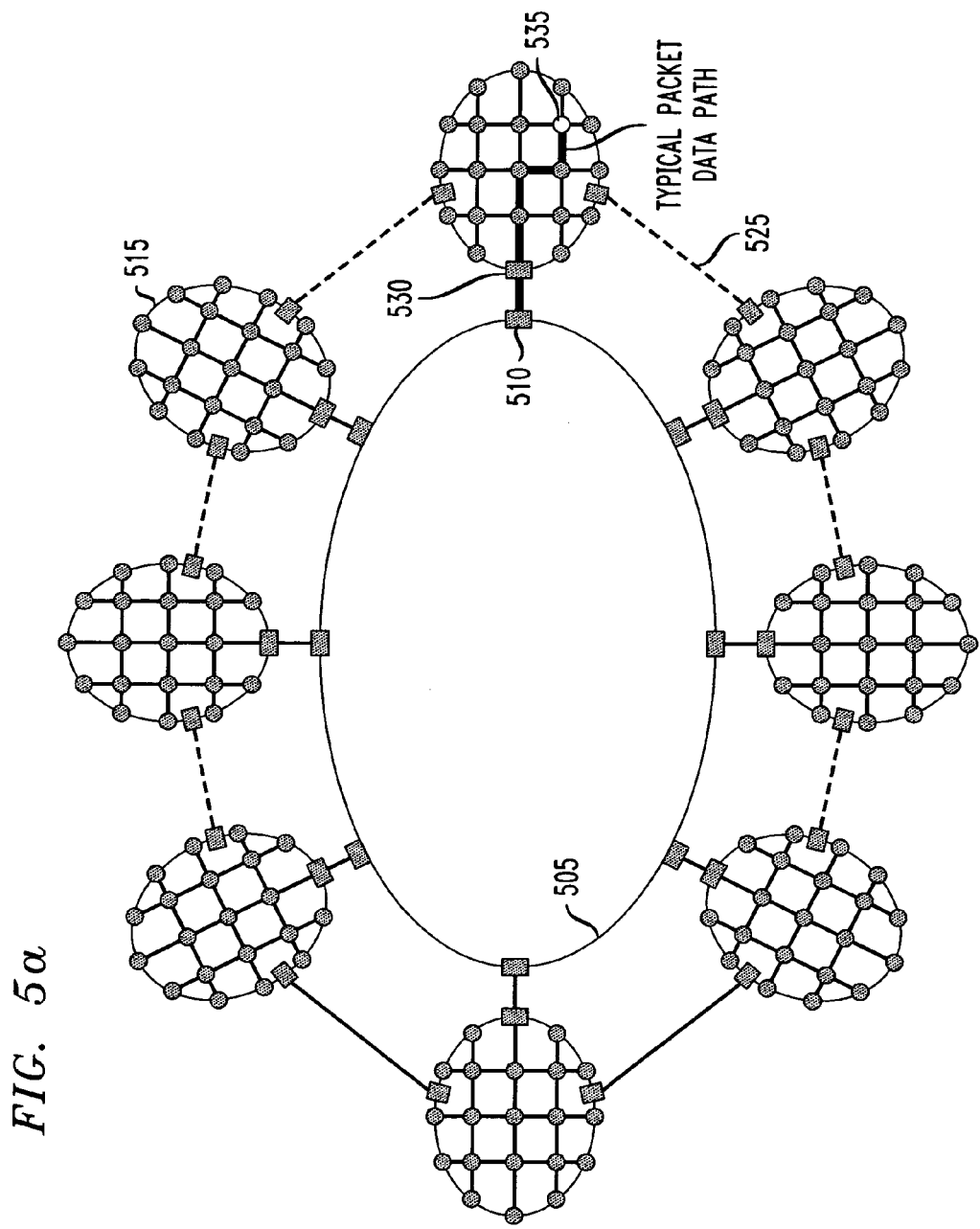
FIG. 5a is an exemplary local mesh aggregation and distribution architecture that could embody the node traffic routing flexibility detailed within the present invention.

In normal metropolitan access operation, a packet going to or coming from the greater network will typically follow a prescribed path defined by the primary distribution/aggregation node packer-header reading and setting up of the route path via the radio layer. Due to wavelength crashes and/or link failure due to physical or weather related events, the optimum path may not be available. Thus, the ability to route around a link problem by allowing specific customer packets that can come in from a different direction and the ability to change the wavelength being transmitted allows for a significantly higher degree of link redundancy and thereby link availability. FIG. 5a depicts a FSO based local mesh network showing, in particular, the redundancy available in such a configuration.

With the ability to locally route wavelength packets for transmission downstream from the network and up-stream, back to the network, as well as local node-to-node and local service domain-to-local service domain via fiber, FSO, and millimeter wave radio; many different mesh configurations and technology mixes are possible of which the most rudimentary are shown in FIGS. 5a–5d. These figures are illustrative only and do not represent all the mesh configurations possible with the above described architecture.

FIG. 5a is an exemplary local mesh aggregation and distribution architecture. Only one local service domain 515 (described later) will be labeled to keep the figure uncluttered. It can be assumed that all of the local service domains are similarly labeled. FIG. 2 depicted an exemplary embodiment of a primary distribtuion/aggregation node. As can be readily seen from FIG. 5a, a primary distribution/aggregation node 510 is a node on a primary fiber metropolitan ring 505. A primary distribution/aggregation node 505 also interfaces to and interacts with a local service domain 515 via a secondary aggregation node 530. The local service domains each have a pair of secondary distribtuion/aggregation nodes 520 which have the same function as a primary distribution/aggregation node 510 in an event of a failure of the primary fiber metropolitan ring 505 or any portion thereof. The secondary distribution/aggegation nodes 520 connect a local service domain 515 to a redundant path metropolitan ring back-up 525. Each of the filled in circles in local service domain 515 is a tertiary aggregation node 535, with one such node labeled in local service domain 515. A data packet path would typically follow a path from the primary fiber metropolitan ring 505 to a primary distribtuion/aggregation node 510 to a secondary distribtuion/aggregation node 530 then through a plurality of tertiary aggregation nodes 535 to its final destination. This same mesh architecture of local service domains 515 also supports the reverse path to accept and collect (aggregate) data packets from the tertiary aggregation nodes 535 of a local service domain 515 for insertion on to a primary fiber metropolitan ring 505.

Figure 5B:
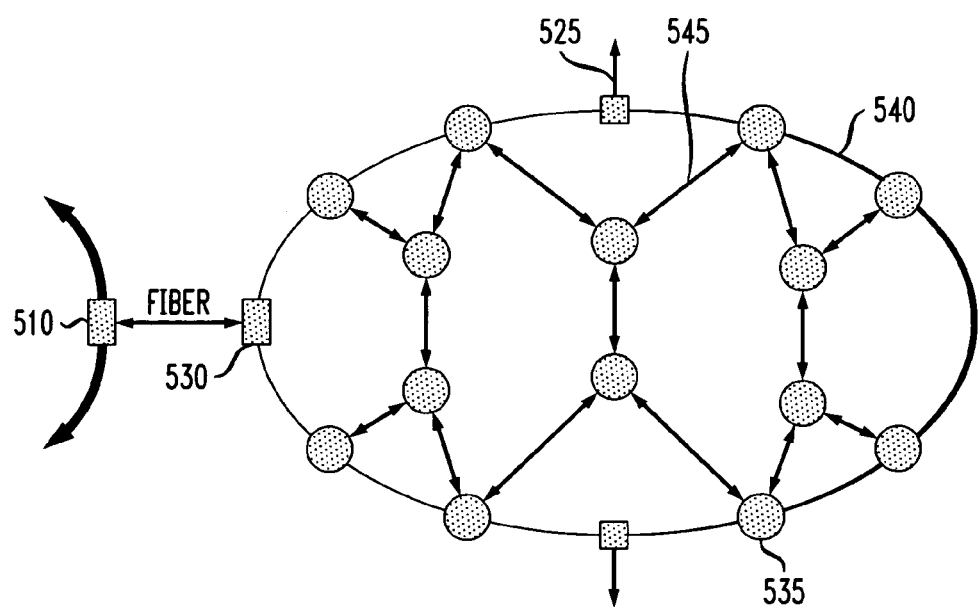
FIG. 5b is an exploded view of a single local service domain that would utilize the node-to-node distribution and transport branches detailed in this invention.

FIG. 5b is an exploded view of a single local service domain from FIG. 5a. In this exemplary embodiment the connection between a primary distribution/aggregation node 510 and as secondary aggregation node 530 is fiber. The terms "exterior" and "interior" are used with respect to the local service domain mesh. The "exterior" tertiary aggregation nodes 535 are connected by a fiber mini-ring 540. Connections between the "exterior" tertiary aggregation nodes 535 and the "interior" tertiary aggregation nodes 535 and between "interior" tertiary aggregation nodes are by means of FSOC building links or millimeter wave radio frequency links 545.

Figure 5C:
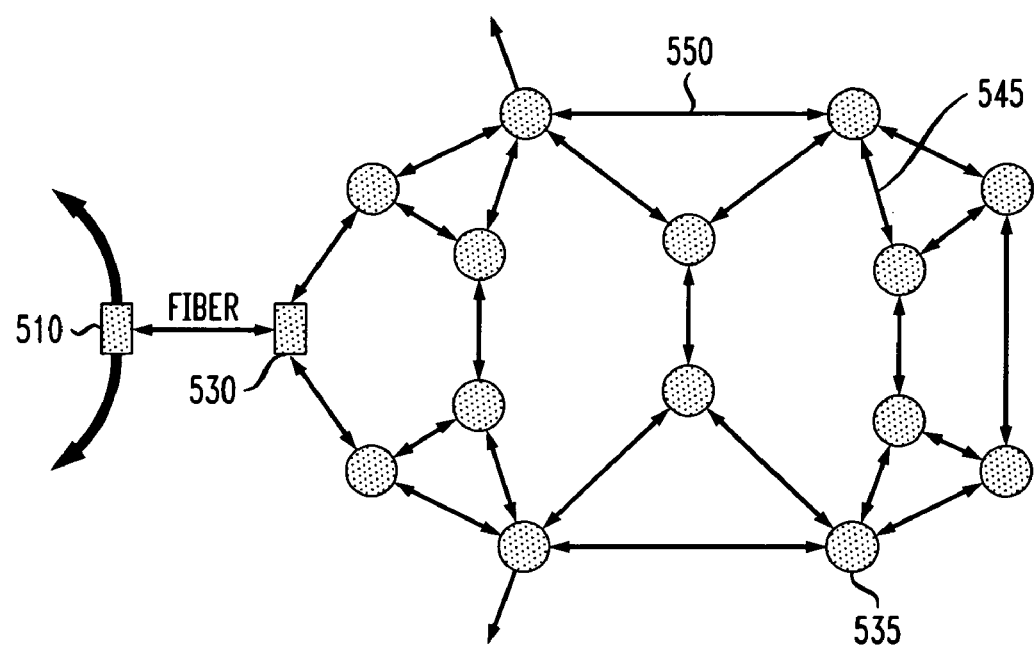
FIG. 5c is another exemplary local service domain embodiment showing increasing migration to the use of FSOC and radio branch-to-node connection-relying less on costly fiber optic deployments.

FIG. 5c is another exemplary embodiment of a single local service domain. Once again the connections between "exterior" tertiary aggregation nodes 535 and "interior" tertiary aggregation nodes 535 and between "interior" tertiary aggregation nodes 535 is by means of FSOC building links or millimeter wave radio frequency links 545. However, in this case the "exterior" tertiary aggregation nodes 535 are connected to each other via a FSOC mini-ring 550. The redundant path metropolitan ring back-up is via an "exterior" tertiary aggregation node and is an FSOC link 555.

Figure 5D:
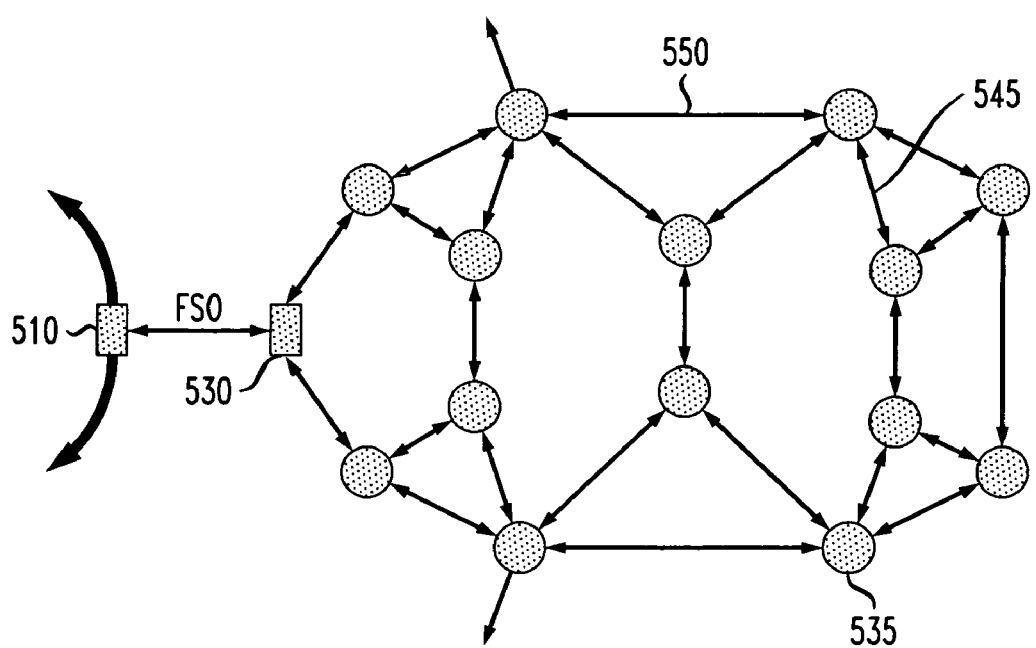
FIG. 5d is yet another exemplary local service domain where the local service domain is fully accessed and serviced by FSOC and radio branching.

FIG. 5d is yet another exemplary embodiment of a local service domain. FIG. 5d is identical to FIG. 5c except that the secondary aggregation node 530 is connected to primary distribution/aggregation node 510 via an FSOC link rather than via fiber.

The FSOC Mesh and Optical Routing Architecture illustrated in FIGS. 5a and 5b rely on optical switching systems that are not restricted to single wavelengths, but are capable of selectively handling single and multiple wavelengths and included customer packets, i.e. WDM and/or "coarse" WDM. The most current example of such technologies is MEMS based micro mirror switches that can route single or multiple wavelengths. New non-MEMS based "color blind" optical switches are being developed. The MEMS technology is suitable for slower routing processes (i.e., connecting customers but is unsuitable for high-speed packet-switching). The proposed grid mesh architecture is a dual layer system. The higher layer provides multi-wavelength (WDM) high capacity cross links in redundant/reconfigurable connectivity between routers within the mesh framework. The architecture's second layer (local routing distribution layer) is localized around each distribution node where each incoming wavelength reaching the node is interrogated for its packet information, and if matched to a local dynamically addressable customer look-up table 210, can be dropped to the local distribution routing layer from the distribution/aggregation routing layer and transmitted on to a local building (or customer 1's premises 260). The primary wavelength packets not detected for local drops are passed back into the out-going wavelength packet multiplexer 225 and on to the remultiplexer 220 for transmission on to the next node.

The outgoing metropolitan mesh multi-wavelength bundled beams and their contained customer packets can be wavelength reassigned and rebundled by the aggregation nodes wavelength packet multiplexers into different branch directions at each node. Customer packets can be multiplexed onto other wavelength channels and directed to different outgoing FSOC transmitters and customer locations. Micro-laser arrays can be used at the bi-directional Lambda 1 to Lambda "n" converter 250 to select a different output wavelength to minimize a potential wavelength conflict at each sequencial node entry and exit wavelength channel (wavelength "crash" is the same wavelength with different customer packets arriving at the same time and same node receiver). The wavelength reconfigurable nature of this routing scheme provides full network redundancy by allowing routing of wavelength packets around a failure point and accessing a customer packet from a different mesh direction a different wavelength. The addition of backup millimeter wave parallel path radio links can be used to further enhances the system branch redundancy, so as to help meet the requirement of "five nines" reliability.

Figure 6A:
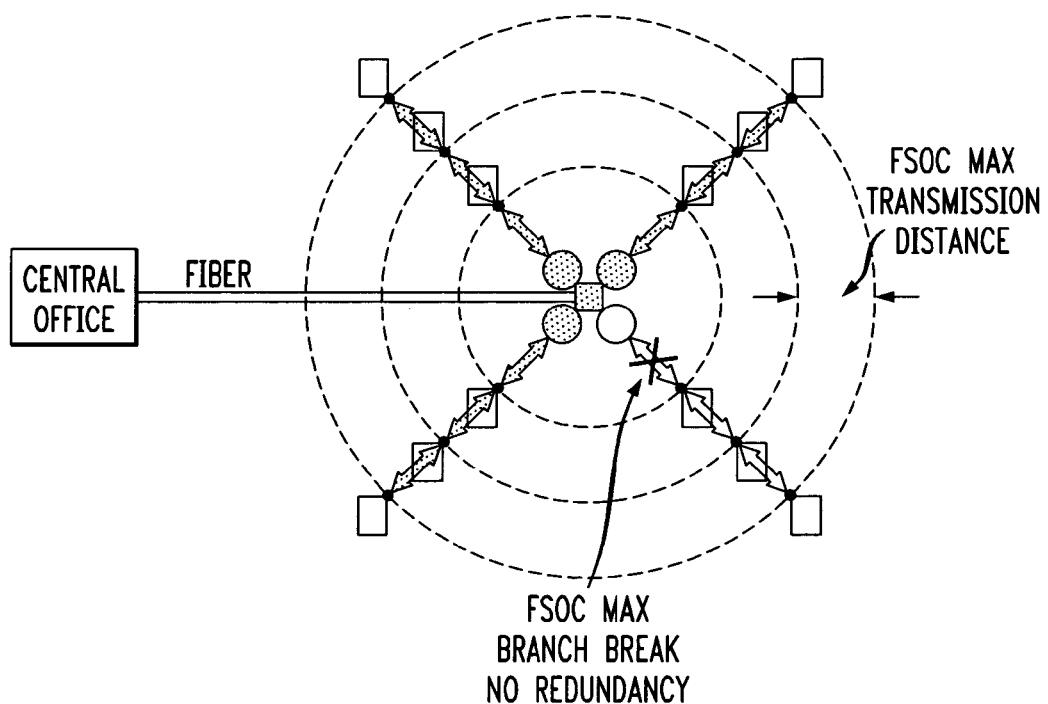
FIG. 6a depicts a conventional multipath architecture using FSOC in a star and branch configuration with single wavelength branches and minimal link redundancy-. This architecture is one currently employed by FSOC based service applications.

FIG. 6a depicts a conventional (known in the art) multi-path architecture using FSOC, that is, a star and branch distribution approach using single "dedicated" wavelength branches. A fiber from the central office provides the multiple wavelengths to the FSOC hub used for distribution locally. The distance between the concentric circles denotes the maximum "reliable" FSOC transmission distance between each node. From the FSOC distribution point, the wavelengths are distributed to a branch using a single wavelength. Assuming a break in the FSOC branch in the lower right, there is no redundancy so that branch would be out of service beyond the break.

Figure 6B:
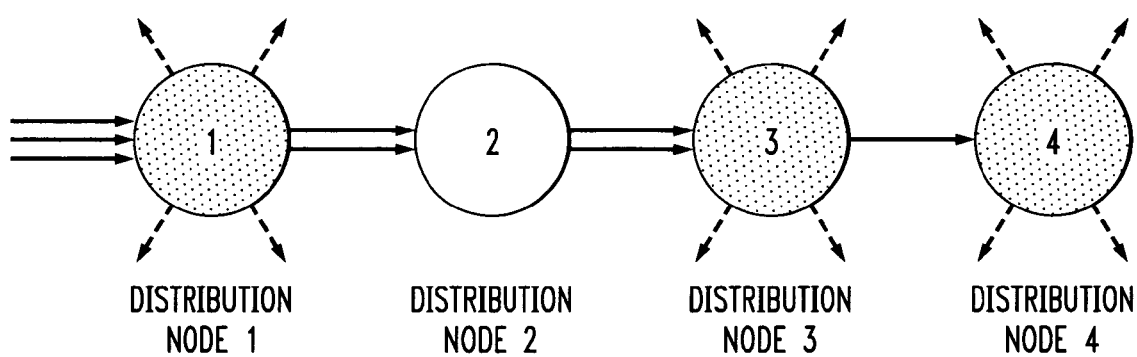
FIG. 6b is a multi-wavelength branch architecture with dedicated wavelength/node distribution.

FIG. 6b is a multi-wavelength branch architecture with dedicated wavelength/node distribution. This architecture is an evolvement of FIG. 6a increasing total link capacity within each branch by transmitting multiple wavelengths within each branch, but each sequential node extracts and distributes a dedicated wavelength until there are no wavelengths left. Depicted here are four nodes with four wavelengths distributed to the first node. One wavelength is dropped from the first node and distributed. That wavelength is no longer available but the remaining wavelengths are distributed to the second node where a second wavelength is dropped from and distributed. Similarly, the second wavelength is now no longer available. Similarly, the third node receives two wavelengths and one of these is dropped at the third node and distibuted. The fourth node receives a single wavelength, which is distributed. There is no possiblility in this arrangement to convert wavelengths either opticaly or electrically. Further, should a break occur between any two nodes then the remaining nodes would be without communications.

Figure 6C:
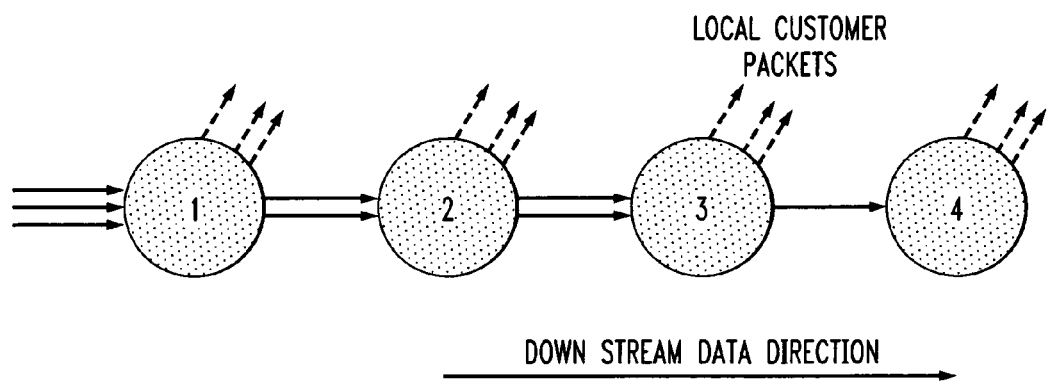
FIG. 6c depicts a multi-wavelength architecture relayed to sequential nodes with localized packet add-drops and a branch distribution.

FIG. 6c depicts a multi-wavelength architecture relayed to sequential nodes with localized packet add-drops and a branch distribution and a branch distribution. This configuration represents a true departure from FIGS. 6a and 6b whereby multiple wavelengths are routed to each consecutive node, and only local customer packets are multiplexed out of the wavelength packet stream and distributed to the local customers. Depicted here are four nodes with four wavelengths distributed to the first node. At each node, packets rather than an entire wavelength are dropped and distributed. This means the wavelengths are available for further distributed to a next sequential node. The wavelength contained packets are packets are dropped at their node addresses until all packets have been dropped. In reverse, packets would be added at each node.

Figure 6D:
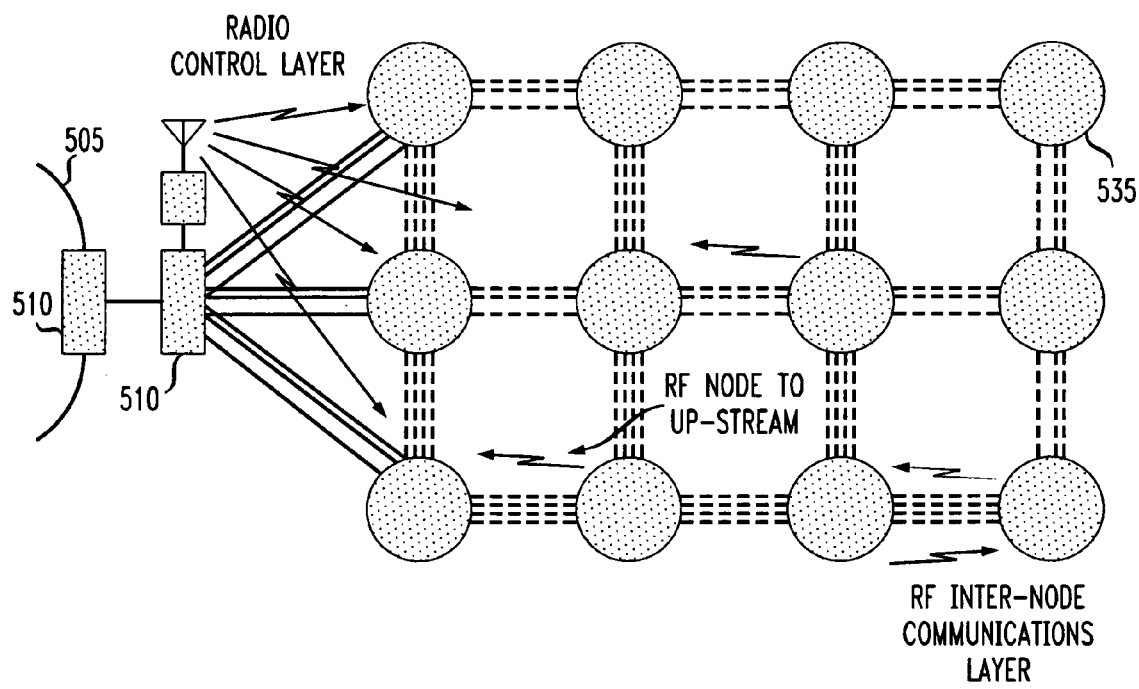
FIG. 6d depicts wavelength non-specific branch distribution into the mesh architecture of the present invention with multi-path capability and redundancy of FIG. 6c.

FIG. 6d depicts wavelength non-specific branch distribution into the mesh architecture of the present invention with multi-path capability and redundancy of FIG. 6c. FIG. 6d is FIG. 6c reconfigured into a mesh architecture whereby each node has multiple access (up-stream/down-stream and cross-connect capabilities) and whereby a particular customer packet can be routed to its destination via a number of alternate paths thereby increasing local network redundancy and service availability. Note also the use of a radio control layer superimposed over the optical transport layer to provide routing, control and status conditions. Here the secondary aggregation node 530 receives communications from primary distribution/aggregation node 510 and primary fiber metropolitan ring 505. Filled in circles represent a plurality of tertiary aggregation nodes 535. Multiple wavelengths are forwarded from the secondary aggregation node 530 to a plurality of tertiray aggregation nodes immediately adjacent to secondary aggregation node 530. Tertiary aggregation nodes 545 are each connected to an adjacent teriary aggregation node to form a mesh. Packets or entire i are dropped to a customer's premises depending upon the service contracted. The wavelength reaching the customer is one locally generated by the last node router next to the customer's premises, not a distant central office (CO) as in the case of a star pattern configuration shown in FIG. 6a. To have such wavelength flexibility and wavelength packet conversion, the mesh proposal requires local control of wavelength packet demultiplexing at each node location. This local capability further requires packet and header detection, high speed optical packet-switching based on look-up tables, high-speed optical routing, wavelength selection and wavelength remultiplexing at each node site. The outgoing recombined wavelength packet channels then can be optically amplified (regenerated) and sent via fiber to the transmit (FSOC) telescope and onto the next node router. The radio control layer is exhibited in FIG. 6d, the down-stream node control data is broadcast from the secondary aggregation node 530 to the tertiary aggregation nodes. Individual nodes are able to reply back to the secondary node controller and inter-node control is also possible for local cuctomer-to-customer routing.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

We claim:

1. An architecture for facilitating wavelength-specific and packet-switched routing comprising:
    a primary metropolitan fiber ring;
    a primary distribution/aggregation node in said primary metropolitan fiber ring; and
    a local service domain further comprising a secondary aggregation node in communication with said primary distribution/aggregation node, wherein said primary distribution/aggregation node further comprises:
    a distribution node;
    an aggregation node;
    a plurality of wavelength packet header readers;
    a plurality of wavelength packet cross-switches in communication with said plurality of wavelength packet header readers;
    a look-up table in communication with said plurality of wavelength packet header readers;
    a switch controller circuit;
    a bi-directional Lambda 1 to Lambda "n" converter and packet generator in communication with said plurality of wavelength packet cross-switches;
    a wavelength packet cross-connect in communication with said Lambda 1 to Lambda "n" converter and packet generator; and
    a remultiplexer in communication with said plurality of wavelength packet cross-switches.

2. The architecture according to claim 1, wherein said switch controller circuit switches a particular wavelength to said remultiplexer via one of said plurality of wavelength packet cross-switches if a packet header does not match a local customer address in said look-up table.

3. The architecture according to claim 1, wherein said distribution node further comprises:
    a plurality of local distribution wavelength packet switches in communication with said plurality of wavelength packet cross-switches;
    a local distribution wavelength packet router in communication with said plurality of local distribution wavelength packet switches; and
    a plurality of wavelength packet multiplexers in communication with said plurality of local distribution wavelength packet switches.

4. The architecture according to claim 3, wherein said local distribution wavelength packet router distributes packets to a customer's premises.

5. The architecture according to claim 4, wherein said packets are distributed to said customer's premises via one of millimeter wave radio, fiber and free space optical communications.

6. The architecture according to claim 3, wherein said local distribution wavelength packet router distributes specific wavelengths to a customer's premises.

7. The architecture according to claim 6, wherein said specific wavelengths are distributed to said customer's premises via one of millimeter wave radio, fiber and free space optical communications.

8. The architecture according to claim 3, wherein said plurality of wavelength packet multiplexers is in communication with said remultiplexer.

9. The architecture according to claim 3, wherein said plurality of wavelength packet cross-switches can be controlled via a separate radio control layer.

10. The architecture according to claim 3, wherein said look-up table and said switch controller circuit assign switching sequences and output ports that correspond to a customer's premises.

11. The architecture according to claim 3, wherein said switch controller circuit governed by said look-up table sets up sequential time-slot switching.

12. The architecture according to claim 11, wherein said local distribution wavelength packet router further comprises a plurality of switches that switch packets in sequential time slots to said packet's respective customer's via one of millimeter wave radio, fiber and free space optical communications.

13. The architecture according to claim 3, wherein said plurality of wavelength packet multiplexers combine multiple sources of data, including a specific customer's wavelengths and local customer's up-stream and down-stream return path packets, back into a network compatible packet stream for distribution to a customer served by another primary distribution/aggregation node in said architecture.

14. The architecture according to claim 3, wherein packets from one customer's premises may be directed to another customer's premises via said wavelength packet cross-connect thereby bypassing transit through one of said distribution node and said aggregation node.

15. The architecture according to claim 3, further comprising:
a broadband photodetector for detecting a wavelength and data rate of customer generated data;
an optical-to-electrical device coupled to said bi-direction Lambda 1 to Lambda "n" converter and packet generator for reading packet header information; and
said bi-directional Lambda 1 to Lambda "n" converter and packet generator packetizes said customer's data and converts said packetized customer's data to a wavelength suitable for transfer through said wavelength packet cross-connect.

16. The architecture according to claim 15, wherein said wavelength packet cross-connect is in communication with said plurality of wavelength packet multiplexers and another customer.

17. The architecture according to claim 15, wherein said bi-directional Lambda 1 to Lambda "n" converter and packet generator selects wavelengths so as not to "crash" with non-available wavelengths due to use of non-available wavelengths by other components in said architecture.

18. The architecture according to claim 3, further comprising:
a broadband photodetector for detecting a wavelength and data rate of customer generated data;
an optical-to-electrical device coupled to said bi-direction Lambda 1 to Lambda "n" converter and packet generator for reading packet header information; and
said bi-directional Lambda 1 to Lambda "n" converter and packet generator packetizes said customer's data and converts said packetized customer's data to a wavelength suitable for transfer through one of said plurality of wavelength packet multiplexers and said aggregation node.

19. The architecture according to claim 18, wherein transfer through said plurality of wavelength packet multiplexers results in said packetized customer's data traveling further down-stream through said architecture.

20. The architecture according to claim 18, wherein transfer through said plurality of wavelength packet multiplexers results in said packetized customer's data traveling further up-stream through said architecture.

21. The architecture according to claim 3, further comprising:
a broadband photodetector for detecting a wavelength and data rate of customer generated data;
an optical-to-electrical device coupled to said bi-direction Lambda 1 to Lambda "n" converter and packet generator for reading packet header information; and
said bi-directional Lambda 1 to Lambda "n" converter and packet generator converts said customer's data to a wavelength suitable for transfer through said wavelength packet cross-connect.

22. The architecture according to claim 21, wherein said wavelength packet cross-connect is in communication with said plurality of wavelength packet multiplexers and another customer.

23. The architecture according to claim 21, wherein said bi-directional Lambda 1 to Lambda "n" converter and packet generator select wavelengths so as not to "crash" with non-available wavelengths due to use of non-available wavelengths by other components in said architecture.

24. The architecture according to claim 3, further comprising:
a broadband photodetector for detecting a wavelength and data rate of customer generated data;
an optical-to-electrical device coupled to said bi-direction Lambda 1 to Lambda "n" converter and packet generator for reading packet header information; and
said bi-directional Lambda 1 to Lambda "n" converter and packet generator converts said customer's data to a wavelength suitable for transfer through one of said plurality of wavelength packet multiplexers and said aggregation node.

25. The architecture according to claim 24, wherein transfer through said plurality of wavelength packet multiplexers results in said customer's data traveling further down-stream through said architecture.

26. The architecture according to claim 24, wherein transfer through said plurality of wavelength packet multiplexers results in said customer's data traveling further up-stream through said architecture.

27. The architecture according to claim 24, wherein said aggregation node receives wavelengths and packetized data from said bi-directional Lambda 1 to Lambda "n" converter and packet generator destined for up-stream primary distribution/aggregation nodes in said architecture.

28. The architecture according to claim 27, wherein said aggregation node optionally demultiplexes up-stream wavelengths in order to insert locally generated wavelengths and packets into an up-steam data path.

* * * * *